Figure 1:
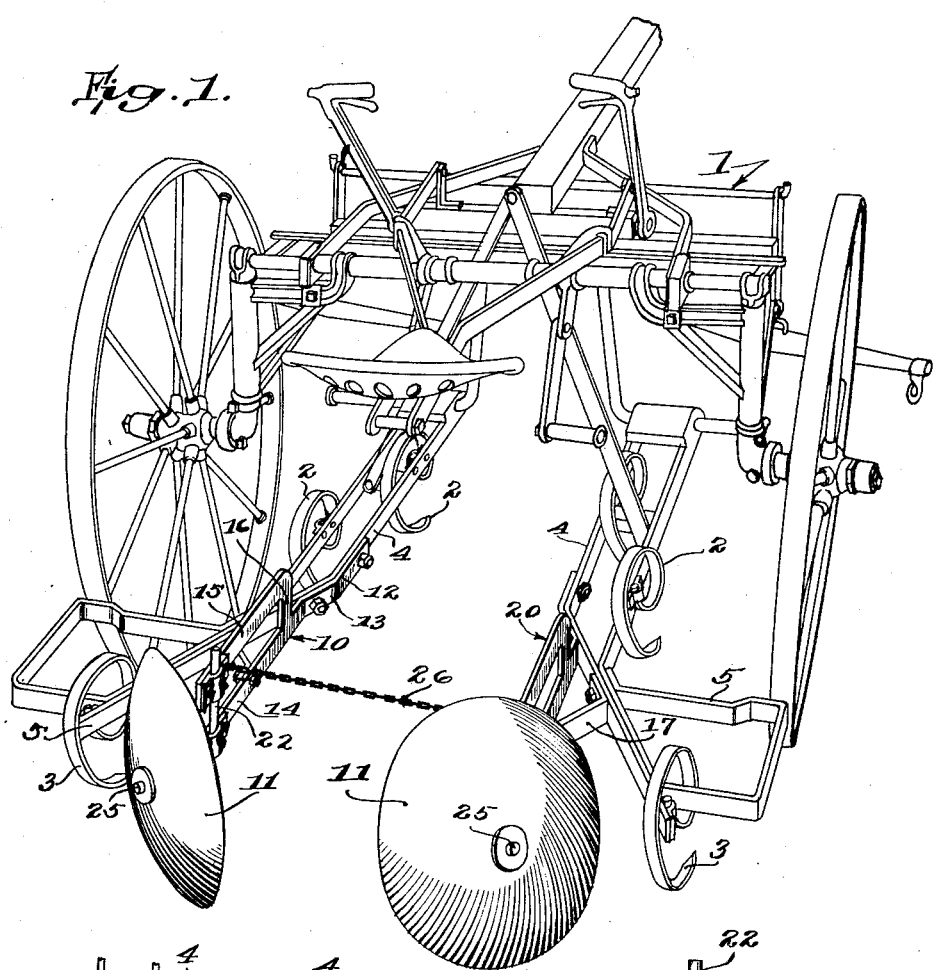

Dec. 16, 1930.  C. M. DE YONE  1,785,676

HILLING ATTACHMENT FOR CULTIVATORS

Filed May 22, 1928

INVENTOR
CHARLES M. DE YONE
BY
ATTORNEY

Patented Dec. 16, 1930

1,785,676

UNITED STATES PATENT OFFICE

CHARLES MARSHALL DE YONE, OF DOVER-FOXCROFT, MAINE

HILLING ATTACHMENT FOR CULTIVATORS

Application filed May 22, 1928. Serial No. 279,748.

This invention relates to a hilling attachment for cultivators, and a primary object of the invention is to provide an attachment of this character which when applied to an ordinary cultivator adapts it for use in cultivating out the weeds between the rows and adjacent the plants, to cover or form hills around the plants and to cultivate the ground in the rear and between the rows.

Another object is to so construct such an attachment that it will remain straight with the rows during the operation of the machine and will leave the ground soft after it passes, not only around but between the rows and which will effectively hill up the plant being cultivated.

Another object is to construct an attachment of this character which when applied to a cultivator will form in one operation both the cultivating and hoeing operations which have ordinarily required separate operations.

A further object is to provide an attachment of this character which may be readily applied to an ordinary cultivator without making any changes therein, and which when not desired for use may be removed.

In carrying out these objects, the invention is susceptible of a wide range of modification without departing from the spirit or sacrificing any of the advantages of the claimed invention; there being shown in the drawings for illustrative purposes a preferred and practical form, in which In the accompanying drawings—

Figure 2:
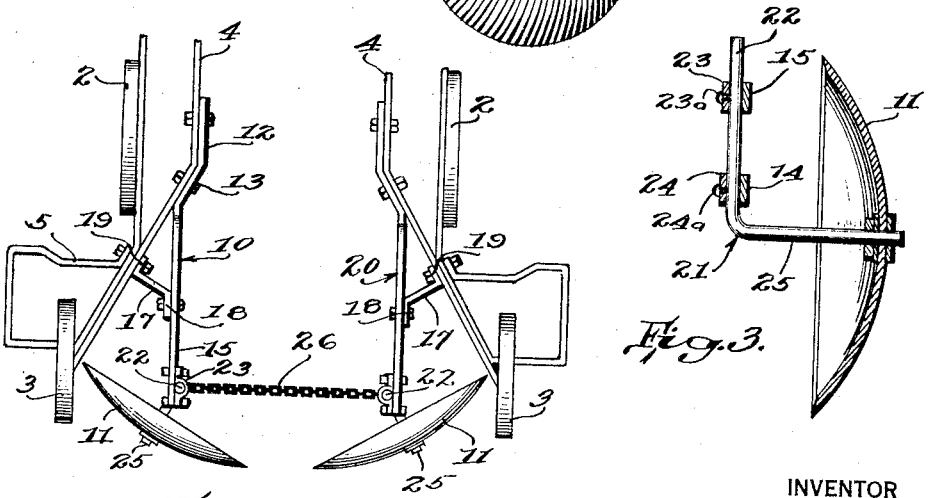
Figure 3:
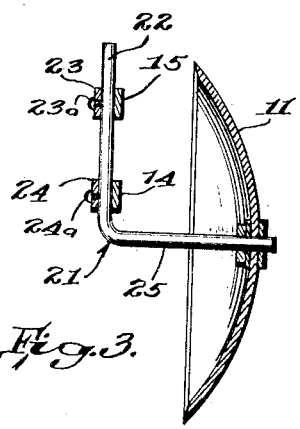

Figure 1 represents a perspective view taken from the rear of a riding cultivator with this improved attachment shown applied, Fig. 2 is a plan view of the attachment shown connected, the parts of the cultivator to which it is fastened and which are not part of the attachment being shown in light lines, and Fig. 3 is a detail vertical section through one of the hilling discs employed.

In the embodiment illustrated a riding cultivator 1 of ordinary construction is shown having the usual spring teeth 2 located at the front portion thereof and similar teeth 3 at the rear between which latter the hilling discs 11, which form a part of the attachment constituting this invention, are located.

The attachment constituting the invention comprises left and right hand members 10 and 20 respectively which are exactly alike in construction except one is made for application to the left side of the cultivator and the other to the right. The member 10 which is the left hand member, is made in the form of a substantially Y-shaped bracket-like frame composed of strap metal of a thickness sufficient to resist the strains to which it will be subjected. This frame 10 has an attaching member 12 in the form of a shank having an offset or bend 13 therein to adapt it to fit snugly against the inner face of the cultivator frame member 4 located at the left side of the cultivator. This shank 12 carries at its rear end parallel edgewise disposed arms or furcations 14 and 15, the former of which extends longitudinally in alinement with the shank 12 while the latter 15 is arranged in a plane above it being connected therewith by a short arm 16. A brace 17 connects the furcation 14 with the outwardly diverging extension 5 of the frame member 4 as is shown clearly in Fig. 2, said brace being provided with oppositely extending feet 18 and 19 which are bolted respectively to the member 14 and to the frame member 5.

Bearings 23 and 24 are carried by the inner faces of the furcations 14 and 15 as shown clearly at the left of Fig. 1 and are designed to receive the upstanding member 22 of an L-shaped shaft 21, the horizontal arm 25 of which extends centrally through the disc 11 and is secured by means of lock nuts. When the disc is placed in adjusted position with the upstanding portion 22 in the bearings 23 and 24 it is locked in this position by means of set screw 23a and 24a carried by the bearings as is shown clearly in Figs. 1 and 3. It will thus be seen that the discs may be set at any desired angle according to the hill to be formed and locked in this position and they are held against separation by a chain 26 attached to the rear ends of the members 14.

It will thus be seen that this hilling attachment may be readily applied to any cultivator already constructed by simply bolting on the members 10 and 20 to the frame members 4 and 5 of the cultivator as is shown clearly in Figs. 1 and 2 and when it is not desired to use this hiller it may be easily removed by unbolting it from these parts and using the cultivator without it.

Without further description it is thought that the features and advantages of the invention will be apparent to those skilled in the art, and it will of course be understood that changes in the form, proportions and minor details of construction may be resorted to, without departing from the spirit of the invention or its scope as claimed.

I claim:

A disk attachment for cultivators comprising a bracket composed of a flat metal strip having a shank with an offset intermediate its ends to fit snugly against the cultivator frame member, parallel edge-wise disposed arms extending longitudinally from one end of said shank, one of said arms being in alinement with said shank, a laterally extending arm connecting the other longitudinal arm to said shank, a brace for connecting one of said arms with the cultivator frame, bearings carried by the free ends of said longitudinal arms, an L-shaped shaft having one arm mounted in said bearings and a disc carried by the other shaft arm, means whereby said disk may be locked on said shaft arm, and means for adjustably connecting said shaft in said bearings.

Signed at Dover-Foxcroft in the county of Piscataquis and State of Maine this 19th day of May, A. D. 1928.

CHARLES M. DE YONE.